US008888953B2

(12) United States Patent
Teck

(10) Patent No.: US 8,888,953 B2
(45) Date of Patent: Nov. 18, 2014

(54) METHOD AND APPARATUS FOR DISPLAY SCREEN SHIELD REPLACEMENT

(71) Applicant: Saxum LLC, Sevierville, TN (US)

(72) Inventor: Teo Chong Teck, Singapore (SG)

(73) Assignee: Saxum LLC, Sevierville, TN (US)

( * ) Notice: Subject to any disclaimer, the term of this patent is extended or adjusted under 35 U.S.C. 154(b) by 0 days.

(21) Appl. No.: 13/914,794

(22) Filed: Jun. 11, 2013

(65) Prior Publication Data

US 2014/0102270 A1  Apr. 17, 2014

Related U.S. Application Data

(63) Continuation of application No. 13/790,212, filed on Mar. 8, 2013.

(60) Provisional application No. 61/715,015, filed on Oct. 17, 2012.

(51) Int. Cl.
| | |
|---|---|
| *B32B 38/10* | (2006.01) |
| *B26D 3/28* | (2006.01) |
| *B26D 7/10* | (2006.01) |
| *B26F 3/00* | (2006.01) |
| *B26D 7/08* | (2006.01) |
| *G02F 1/13* | (2006.01) |

(52) U.S. Cl.
CPC .. *B26D 3/28* (2013.01); *B26D 7/10* (2013.01); *B26F 3/004* (2013.01); *B26D 7/08* (2013.01); *G02F 1/1309* (2013.01); *Y10S 156/924* (2013.01); *Y10S 156/937* (2013.01)
USPC ........... 156/703; 156/711; 156/717; 156/752; 156/756; 156/762; 156/924; 156/937

(58) Field of Classification Search
USPC ......... 156/703, 711, 717, 752, 756, 762, 924, 156/937
See application file for complete search history.

(56) References Cited

U.S. PATENT DOCUMENTS 3,451,872 A * 6/1969 Townsend ..................... 156/254
3,756,111 A  9/1973 Weidenmiller
(Continued)

FOREIGN PATENT DOCUMENTS

| DE | 102005021548 | 12/2006 |
|---|---|---|
| EP | 2381461 | 10/2011 |

(Continued)

OTHER PUBLICATIONS

International Search Report and Written Opinion for PCT Patent App. No. PCT/US13/65394 (Apr. 16, 2014).

(Continued)

*Primary Examiner* — Mark A Osele
(74) *Attorney, Agent, or Firm* — Cermak Nakajima & McGowan LLP; Adam J. Cermak

(57) ABSTRACT

A method and apparatus for replacement of damages display shield (typically glass) covering a display screen on a device, typically a mobile phone. Mobile phones have an electronic display protected by a glass shield. Between the glass and the display is often a plastic polarizing or other intermediary sheet. Removal of a damage glass can be accomplished by cutting thru the polarizer with a moving wire or blade. This separates the glass from the sensitive display and allows replacement of the glass without damaging the more expensive display.

28 Claims, 10 Drawing Sheets

(56) References Cited

U.S. PATENT DOCUMENTS

| | | | |
|---|---|---|---|
| 4,685,991 A * | 8/1987 | Herrmann et al. | 156/701 |
| 5,772,093 A | 6/1998 | Kanehira | |
| 6,227,276 B1 * | 5/2001 | Kim et al. | 156/763 |
| 6,409,562 B1 | 6/2002 | Asano et al. | |
| 6,979,243 B2 | 12/2005 | Watanabe | |
| 7,150,804 B2 | 12/2006 | Tajima | |
| 8,118,075 B2 | 2/2012 | Sampica et al. | |
| 8,141,611 B2 | 3/2012 | Lai et al. | |
| 8,152,945 B2 | 4/2012 | Toyoda et al. | |
| 8,152,947 B2 | 4/2012 | Toyoda et al. | |
| 8,349,129 B2 | 1/2013 | Blanchard et al. | |
| 2005/0020178 A1 | 1/2005 | Holappa et al. | |
| 2008/0056326 A1 | 3/2008 | Duan et al. | |
| 2010/0154992 A1 | 6/2010 | Feinstein et al. | |
| 2010/0199818 A1 | 8/2010 | Lee | |
| 2011/0180218 A1 | 7/2011 | Ciliberti et al. | |
| 2011/0197724 A1 | 8/2011 | Harris et al. | |

FOREIGN PATENT DOCUMENTS

| | | |
|---|---|---|
| JP | 2004-184677 | 7/2004 |
| JP | 2007276040 | 10/2007 |

OTHER PUBLICATIONS

Office Action from U.S. Appl. No. 14/064,506 dated Feb. 6, 2014.

* cited by examiner

METHOD AND APPARATUS FOR DISPLAY SCREEN SHIELD REPLACEMENT

CROSS-REFERENCE TO RELATED APPLICATION

This application is a continuation of Ser. No. 13/790,212 filed on 8 Mar. 2013 which claims the benefit of U.S. Provisional Application No. 61/715,015 filed 17 Oct. 2012, which hereby is incorporated herein by reference in its entirety.

BACKGROUND

1. Field of the Disclosure

The present disclosure invention is directed to a method and apparatus for replacement of displays shield/glass on devices such as mobile phones.

2. Description of the Related Art

The proliferation of devices with display screens, particularly small mobile devices, such as smart phones, means that there are large numbers of expensive mobile devices subject to harsh conditions. Typically, the most vulnerable portion of such devices is the display screen which is often made of a hardened glass such as Gorilla® glass from Corning, Inc. Regardless of how strong the glass is made, some of them will inevitably be broken, cracked or scratched to the point where the device is useless unless the glass is replaced.

The cost of glass replacement has been prohibitive relative to the cost of the device, because even though expensive, improvements on such devices, limits the realistic investment on repair.

The solution is to make the cost of repair/replacement of the glass sufficiently competitive to make it practical to repair rather than replace the device.

The problem has been that most display screens are a composite of glass (upper layer), a bonding layer, which may include a polarizer and then the electronic display component. Separation of the broken/damaged glass from the display unit without destroying the display component has been largely impossible. If the repair of the glass includes complete replacement of the display unit, then entire task is typically cost prohibitive. Even warranty service by the manufacturer is financially impaired by the cost of repair.

Thus a method and apparatus is needed which can efficiently replace the glass but not require replacement of the electronic display unit.

The present disclosure addresses both of these problems with an innovative solution.

BRIEF SUMMARY OF THE INVENTION

The following summary is intended to assist the reader in understanding the full disclosure and the claims. The claims define the scope of the invention, not this summary.

The present disclosure includes a method and apparatus for replacing protective glass on a device having a display or the display alone.

In the method, a display unit having protective glass top surface, electronic display device and an intermediate layer therebetween is held in a bed/jig/carrier. A wire having a thickness of less or equal to that of the intermediate layer is coplanar with said intermediate layer. Then the display unit and wire are moved relative to each other so that the wire will progressively penetrate the intermediate layer and separate the glass from the electronic display by cutting thru the intermediate layer.

In a further embodiment, the display unit may be fixed and the wire may be moveable into the intermediate layer in a Y axial direction.

In a further embodiment, the wire may be moving in an X axial direction while it is moving in a Y axial direction to increase the cutting speed.

In a further embodiment, the wire may be heated to more rapidly cut or melt the intermediary layer.

In a further embodiment, the display unit may be moved collinearly along a plane as the wire penetrates the intermediate layer.

In a further embodiment, the display unit may remain fixed in a plan while the wire moves in a coplanar direction thru the intermediate layer.

In a further embodiment, the wire may be replaced with a blade.

In a further embodiment, the blade may reciprocate.

In a further embodiment, the blade may be heated to speed passage thru the intermediary layer.

Alternatively, the wire can be replaced by a laser beam which cuts thru the intermediary layer.

Alternatively a high pressure water jet can be used in place of the wire to cut thru the intermediary layer.

Alternatively, the display unit may be heated, with the electronic display portion cooled and the intermediate layer can be melted and suctioned away or the display portion and glass can we suctioned apart while the intermediary layer is liquefied.

Alternatively, an acid may be applied to the unit which attacks the intermediary layer without affecting the electronic display portion and glass so that the layer is dissolved.

In the apparatus disclosure, a machine includes:
a. rail mounting on a housing;
b. a moveable bed/jig slidable along the rail in a predetermined plane;
c. a drive motor;
d. a pair of guide rollers on either side of the moveable bed;
e. a wire driven by said motor to travel from one guide roller to the other along a Y axis in said predetermined plane;
f. an adjuster for moving said guide roller and consequently said wire into said predetermined plane;
whereby placing of a display unit consisting of a sandwich of an electronic display portion, an intermediate layer and a glass protective cover into said bed and collinearly aligning said wire to be in the same plane as said intermediate layer, so that moving the wire thru said plane will cause the electronic display to separate from the glass cover by cutting through the intermediate layer.

In a further embodiment, the guide rollers have a recessed waist portion for receiving and guiding the wire and wherein said waist is located in a plane below the plane of the intermediate layer.

In a further embodiment, the guide rollers have a recessed waist portion for receiving and guiding the wire and wherein said waist is located in a plane above the plane of the intermediate layer.

In a further embodiment, the wire is heated electrically as it moves in the x and y planes.

In a further embodiment, the wire is heated electrically but does not move in the X plane, but only the Y plane into the intermediate layer.

In a further embodiment, the wire is heated by external sources.

In a further embodiment, the wire is replaced by a planar blade whose planar location is adjustable to match the plane in which the intermediate layer resides.

In a further embodiment, the blade reciprocates in said plane.

In a further embodiment, the blade is heated to melt the intermediary layer.

In a further embodiment, the blade is heated on one surface, the surface adjacent the glass, and cooled on the other surface, the surface adjacent the electronic display unit.

In a further embodiment, the blade is replaced by a laser which is aligned to cut the intermediate layer.

In a further embodiment, the blade is replaced by a high pressure jet which cuts the intermediate layer.

In a further embodiment, the electronic display is cooled whilst the glass is heated thereby softening the intermediate layer.

Also disclosed is a method of removing a protective glass top surface from a display unit having a glass top, an electronic display portion and an intermediate layer therebetween comprising any or all of the following steps:
- a. fixing the display unit in a carriage with the intermediate layer being exposed on all sides;
- b. aligning a cutting device in a coplanar relationship with the intermediate layer;
- c. driving the cutting device into the intermediate layer while moving the cutting device and display unit are moved relative to each other along an axis generally orthogonal to the cutting device;
- d. advancing the cutting device into the intermediate layer to separate the glass top from the electronic display portion.

Also disclosed is a method wherein said cutting device is moved while the carriage is stationary.

Also disclosed is a method wherein the cutting device is stationary while the carriage is moved.

Also disclosed is a method further including the step of moving the cutting device laterally to the direction of entry into the intermediate layer.

Also disclosed is a method further including the step of heating the cutting device.

Also disclosed is a method further including the step of applying solvent to the cutting device, said solvent capable of softening the intermediate layer.

Also disclosed is a method wherein said cutting device is a laser beam.

Also disclosed is a method wherein said cutting device is a wire.

Also disclosed is a method wherein said cutting device is a flat blade of thickness less than the intermediate layer.

Also disclosed is a method wherein said cutting device is spray jet of cutting fluid.

Also disclosed is a method wherein said cutting device is heated by passing a current through it.

Also disclosed is a method further including the step of biasing the wire in the intermediate layer adjacent the electronic display portion and away from the glass, to minimize encounters with broken glass.

Also disclosed is a method wherein said biasing step includes locating wire guide posts in a plane below that of the electronic display portion so that the wire is biased against that portion as it enters and exits the intermediate layer.

Also disclosed is a machine for removing protective cover glass from a display unit having a cover glass, an electronic display portion and an intermediate layer sandwiched therebetween, said intermediate layer defining a first plane between the layer and the glass and a second plane between the intermediate layer and the electronic display portion comprising:

- a. a housing;
- b. a carrier for holding the display unit, said carrier configured to hold said unit without blocking access to said intermediate layer;
- c. a slideable interface interposed between the housing and carrier for moving the carrier relative to the housing;
- d. a pair of first and second guides connected to said housing and located on either side of the carrier;
- e. a cutting element configured to travel in a path from one guide to the other in a third plane;
- f. an adjuster for positioning said guide roller and consequently said cutting element between the first and second planes, whereby said cutting element is aligned between said first and second planes to cut through said intermediary layer and separate the glass from the electronic display element.

Also disclosed is a machine wherein said guides are located such that said third plan either above or below said first and second planes so that said cutting element is biased to engage said intermediate layer at either said first or second plan respectively.

Also disclosed is a machine wherein said cutting element is a wire.

Also disclosed is a machine wherein said cutting element is a blade with a thickness less than the distance said first and second planes.

Also disclosed is a machine wherein said cutting element is a wire and where the wire follows a path from a supply spool to the first guide, to the display unit, to the second guide and to a take up spool.

Also disclosed is a machine wherein said wire is driven by a motor and controller which creates reciprocal motion.

Also disclosed is a machine wherein said cutting element is heated by passing the wire adjacent a heater.

Also disclosed is a machine wherein said cutting element is heated by passing electricity through it.

Also disclosed is a machine wherein said cutting element is a fluid jet.

Also disclosed is a machine wherein said cutting element includes a solvent sprayer.

Also disclosed is a machine wherein said cutting element includes a laser cutter.

Also disclosed is a machine wherein said cutting element is stationary and said carrier is movable.

Also disclosed is a machine wherein said cutting element is moveable and said carrier is stationary.

Also disclosed is a machine wherein said cutting element and carrier are both movable.

Also disclosed is a machine wherein said guides include a shock absorber.

Also disclosed is a machine wherein said shock absorber includes mounting said guides on a spring bias element.

Also disclosed is a machine wherein said supply and take-up spools are wound.

Also disclosed is a machine wherein one of said spools is wound clockwise and the other counter-clockwise.

Also disclosed is a machine wherein said shaft is driven by a motor and further including a snag sensor to stop the motor if the wire hits an obstruction.

Also disclosed is a machine wherein the cutting element includes a source of heat to heat a leading edge of the element on its exterior face.

Also disclosed is a machine further including a cooling device placeable adjacent the electronic display portion on its exterior face.

Also disclosed is a machine further including a heating device placeable adjacent the cover glass.

Also disclosed is a machine further including a cooling device placeable adjacent the electronic display portion and a heating device placeable adjacent the cover glass.

Also disclosed is a machine further including a pool of cold non-conductive liquid in which the electronic display portion is received.

DETAILED DESCRIPTION OF THE DISCLOSURE

The present description discloses a method and apparatus for replacing damaged protective transparent covers on displays. Typically such covers are glass, but can be any transparent or even translucent material which is generally used to provide protection to the underlying electronic display portion, such as an LCD or Led or liquid crystal display or the like. The term "glass" therefore should be interpreted broadly beyond conventional silica or quartz based protectors to any transparent or translucent material for protective purposes.

Figure 7:
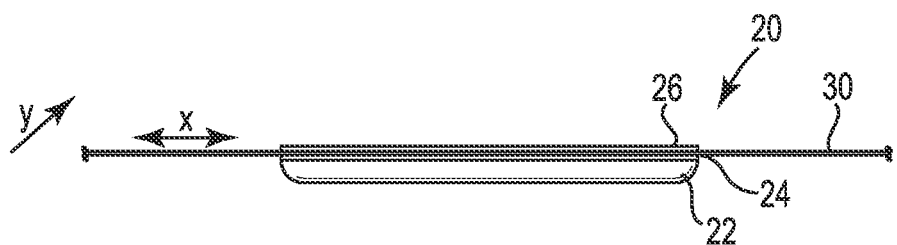
FIG. 7 illustrates an end plan view of a display unit of three layers with a portion of the cutting wire shown.

As shown in FIG. 7, a mobile device 20, such as a cell/mobile phone generally use a sandwich structure of a first "glass" protective layer 26, an intermediary layer 24, which can be a transparent tape adhesive, a liquid adhesive, a plastic polarizer layer or other bonding layer and then an electronic display portion 22. Regardless of the nature of the intermediate layer, it has a particular thickness which can be utilized in the inventive concepts disclosed herein. The intermediate layer is bounded by upper and lower interface planes which are adjacent the electronic display portion and the glass layer and distance between those planes is the thickness of the layer. Upper and lower are terms which can be interchangeable because the glass layer can be on the top or bottom depending on the configuration of the method or machine. When assembled, this structure appears unitary and attempts to pry the glass layer from the electronic display will almost certainly destroy the electronic display.

Figure 1:
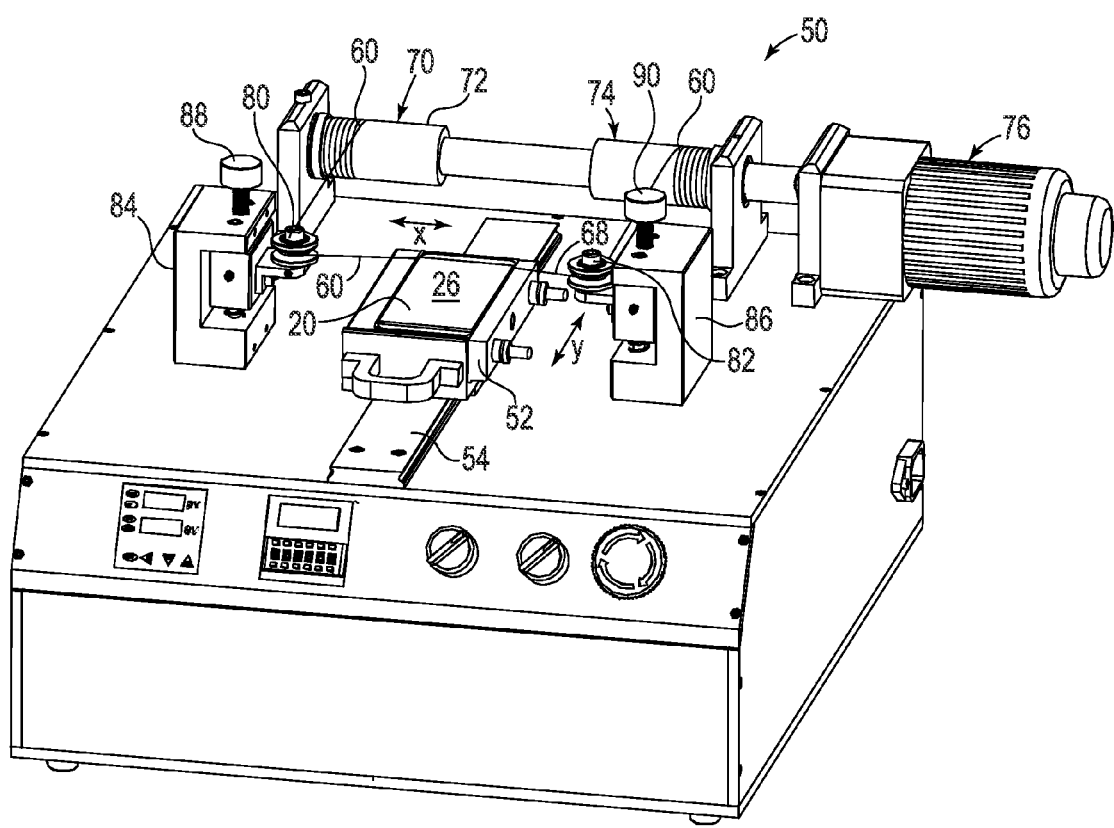
FIG. 1 illustrates a perspective view of a wire cutting machine.
Figure 2:
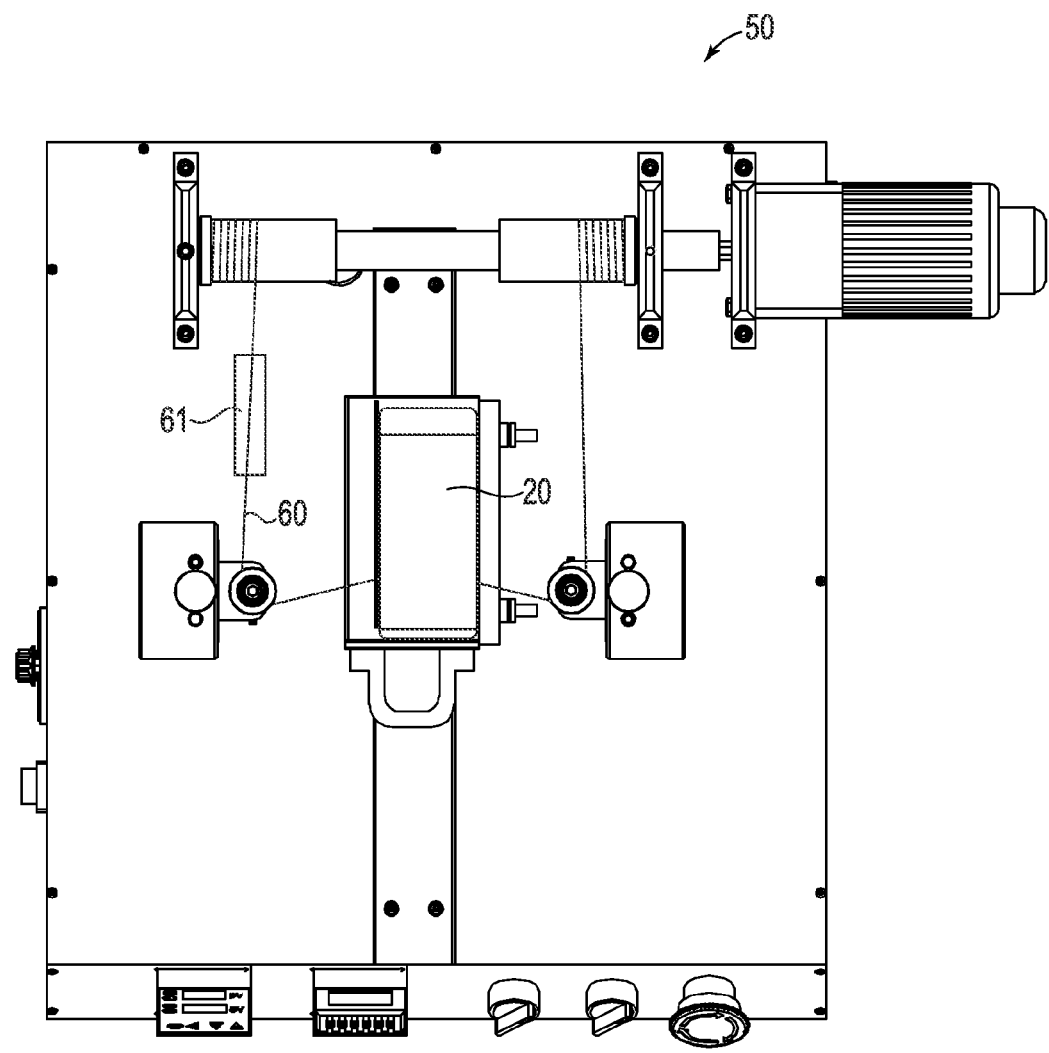
FIG. 2 illustrates a top plan view of the machine in FIG. 1.
Figure 3:
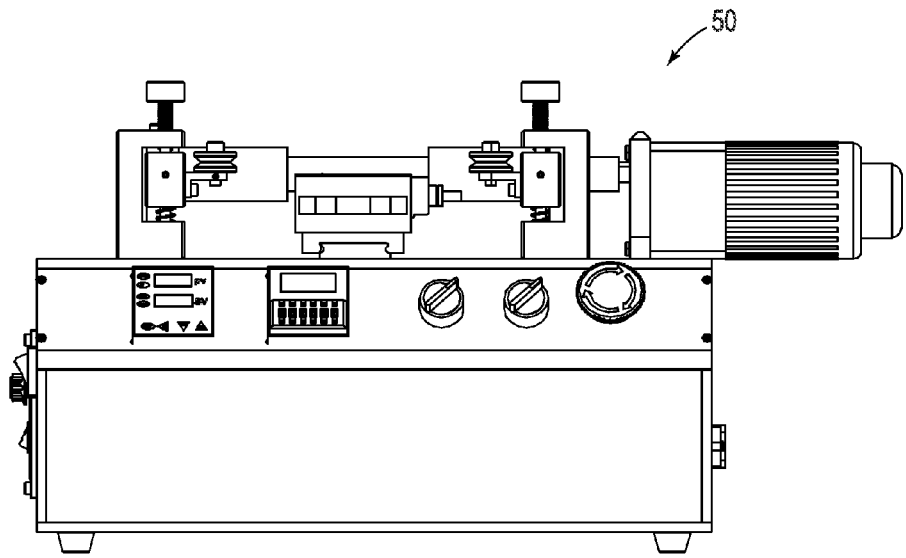
FIG. 3 illustrates a front view of the machine in FIG. 1.
Figure 4:
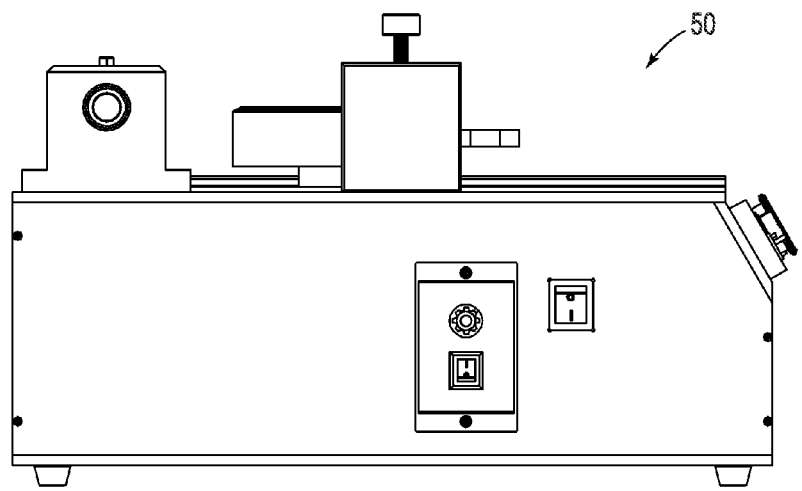
FIG. 4 illustrates a side plan view of FIG. 1.
Figure 5:
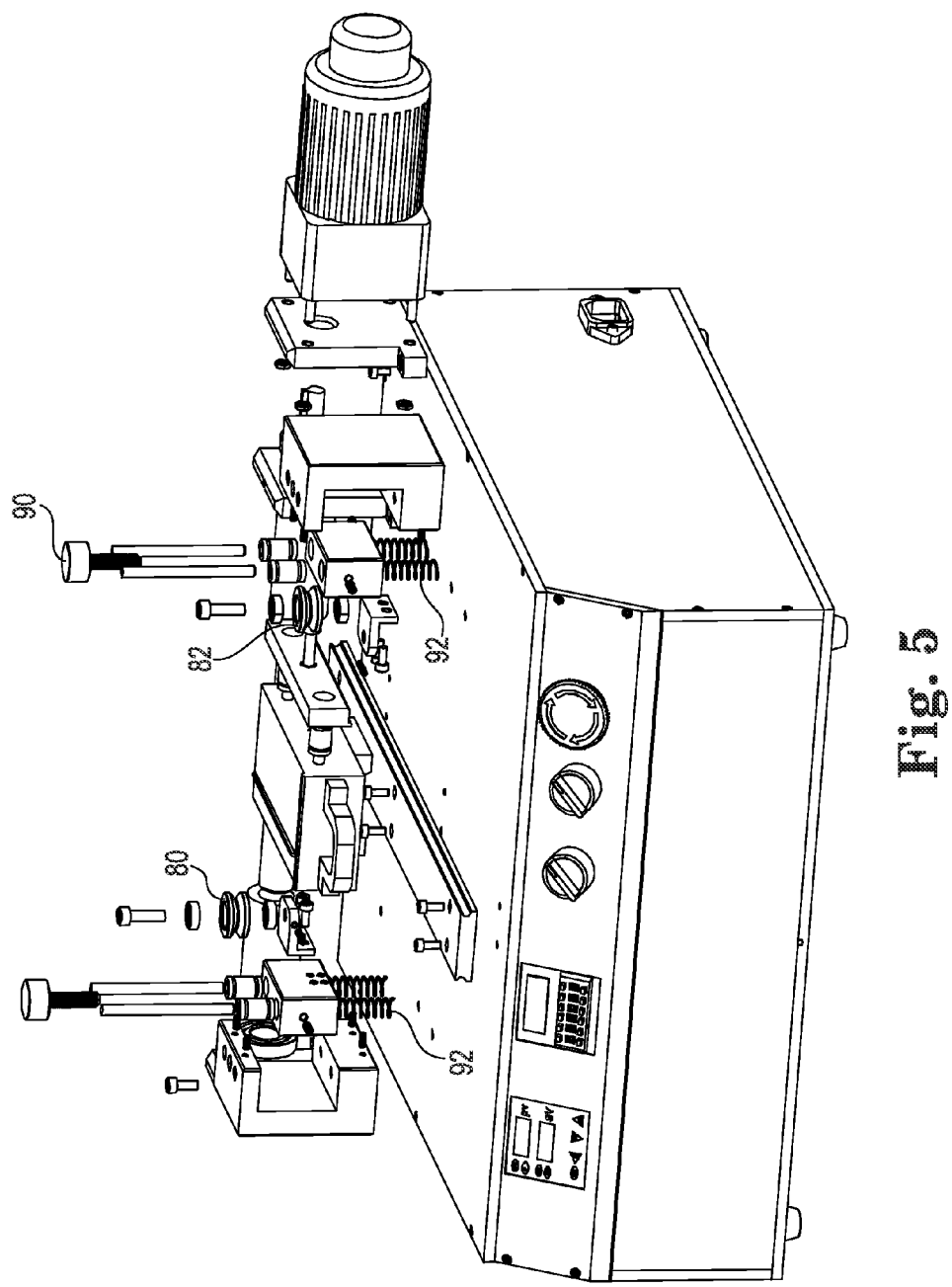
FIG. 5 is a view like FIG. 1 in exploded view.

As shown in FIG. 5, and as will be explained herein, the use of a thin wire 30 interposed between layers 22 and 26, and aligned in a coplanar relationship with the intermediate layer, preferably as close as possible to the plane adjacent the electronic display portion 22. The wire, one of several possible cutting elements, can be used to separate layers 22 and 26 without damage to layer 22. Damage to layers 24 and 26 is unimportant because the glass will be replaced and the intermediate layer may be destroyed.

By interposing a wire or cutting blade of thickness equal to or less than that of layer 24, cutting or melting action of driving the wire or blade into the intermediate layer (or moving the layer into the cutter will free the electronic display unit from the glass layer 26 without damage to the electronic display).

The preferred method of separating the electronic display unit (the only expensive and valuable component) for reuse is to bias the wire or blade against/adjacent or close to the plane adjacent the electronic display, i.e. the surface of the electronic display and maintaining cutting element in a coplanar relationship with that plane adjacent the electronic display. This can be accomplished with a wire by keeping it taut and aligning it carefully to maintain the coplanar relationship. A slight bias of the wire against the electronic display can be helpful in keeping it as far from the glass layer as possible to prevent encountering/snagging of the glass layer 26. Snagging is a risk if the glass is broken, because shards may be driven into the intermediate layer. Fortunately, the intermediate layer, such as a polarizer, acts as a safety shield, much like safety glass to prevent extreme intrusion of the glass into the electronic display layer.

As an alternative, the method can be practiced by aligning the wire in the same plane as the intermediate layer 24 or in any plane between the two interface planes Because the wire may be thinner than layer 24, there could be multiple available planes. The preferred plan is closest to the electronic display for reasons set forth above.

The cutting action is accomplished by moving the display unit 20 relative to the wire along an axis, indicated here as the Y axis as shown in FIG. 7. The y\Y axis is "into" the page along the face of unit 20. This can be accomplished by moving the wire, the display unit or both toward each other. The mere pressure of the wire will push thru layer 24, but the process is enhanced if wire 30 moves along the X axis as shown. The movement can be continuous in either direction or reciprocating, which is preferred. The wire will naturally heat up as it moves thru the layer and the heat will help melt the layer further accelerating the process.

To further increase the cutting action of the wire, the wire itself can be heated, either indirectly by a heating unit 61 adjacent to the wire, or by running a current thru the wire. Ni-chrome or other resistive wire is preferred but the wire could be heated by magnetic induction, particularly if ferromagnetic.

To further increase cutting action, and limit the risk of damage to the electronic display, a blade (and to a lesser degree a wire) can be cooled on the face which contacts the electronic display and heated on the face which contacts the glass and on its leading/cutting edge. Heating and cooling elements can be provided which apply an air or liquid jet of appropriate temperature as the blade circulates or reciprocates in an out of contact with layer 24.

The wire or blade could also run through a pool or spray of solvent, (acid, base, alcohol, etc) which could assist in dissolving layer 24.

In addition, instead of a wire or blade, the cutting action could be achieved by a high pressure cutting fluid jet stream from a precisely aligned nozzle. The fluid could include solvents to dissolve layer 24.

In addition, a precisely aligned laser beam could likewise be used to dissolve layer 24.

In addition, the layers could be separated by applying heat to the sandwich unit 20 and suction to the glass 26 and electronic portion 22 and the layers would be separated. To minimize the risk of damage to the electronic unit, it could be simultaneously cooled by a cold jet or immersion into a cold non-conductive liquid while being held in the carrier. The glass layer can be made hotter than the electronic layer to facilitate melting or softening of the intermediate layer to enhance separability. This concept can also be combined with the wire, blade, laser and solvent methods mentioned above.

The method is also illustrated through the apparatus disclosed in the various figures. FIGS. 1-4 illustrate a wire cutting machine 50 with a display unit 20, portion of a mobile phone, shown in place ready for glass removal. The display unit is shown in the preferred orientation with the glass portion 26 facing up. The opposite arrangement is also possible. The electronic display portion and intermediary layers are not visible.

The display unit 20 is placed in a carrier/bed/jig/carrier 52 which is connected to the housing by a slideable interface which allows the carrier to move relative to the housing. As shown, one embodiment has an underside which has grooves sized to receive engagement with a rail 54 to allow it to slide along a Y axis either by hand movement or electrical actuation. It is preferred if the carrier 52 grip the display unit without occluding access/blocking the intermediate layer on any side. This is because the cutting element must slice thru the entire intermediate layer without encountering obstacles and thus it must be exposed on all sides. Vacuum attachment from the underside of the display unit is one option. Alternatively, a carrier 52 may use other releasable attachment systems such Velcro®, or have a recess in the carrier sized to receive for the electronic display or glass portion. Grippers are also possible with side fingers spaced around the carrier to hold the unit and prevent movement. Hand movement of the carrier is preferred so that the user can feel if there is any obstruction/snag though an impact/snag sensor and electrical drive (such as shown in the later embodiments) is also possible.

The cutting wire 60 is shown in various places along its route. In the preferred embodiment, wire 60 is spooled onto bar 70 which have enlarged diameter portions 72, 74. One is referred to as a source and the other as a take up spool but they may also be the same spool. In this embodiment, the source and take-up spool reverse direction so that the wire is moved in reciprocating directions. Continuous loop wires are also possible so that direction need not be reversed. Bar 70 is supported on bearings and driven by a motor 76 which is actuated in one direction for a period of time until the spool is largely played out and then reversed.

Wire 60 then follows a path from the spools to the display unit. Vertically adjustable spindles 80/82 guide the wire by virtue of their narrowed waist/tracking band and rising angular sidewalls, where the wire is tracked in at its narrowest point. The height of the spindles is controlled by an adjustment mechanism 84/86 which include thumbscrew 88/90 for Y axis (vertical) adjustment of each spool preferably independently. The spindles are shown along the same orthogonal axis with respect to the carrier but it is possible to have one of the spindles lead the other (i.e. be located off that axis). This will result in a slight cross/diagonal cut action which may be desirable.

Figure 6:
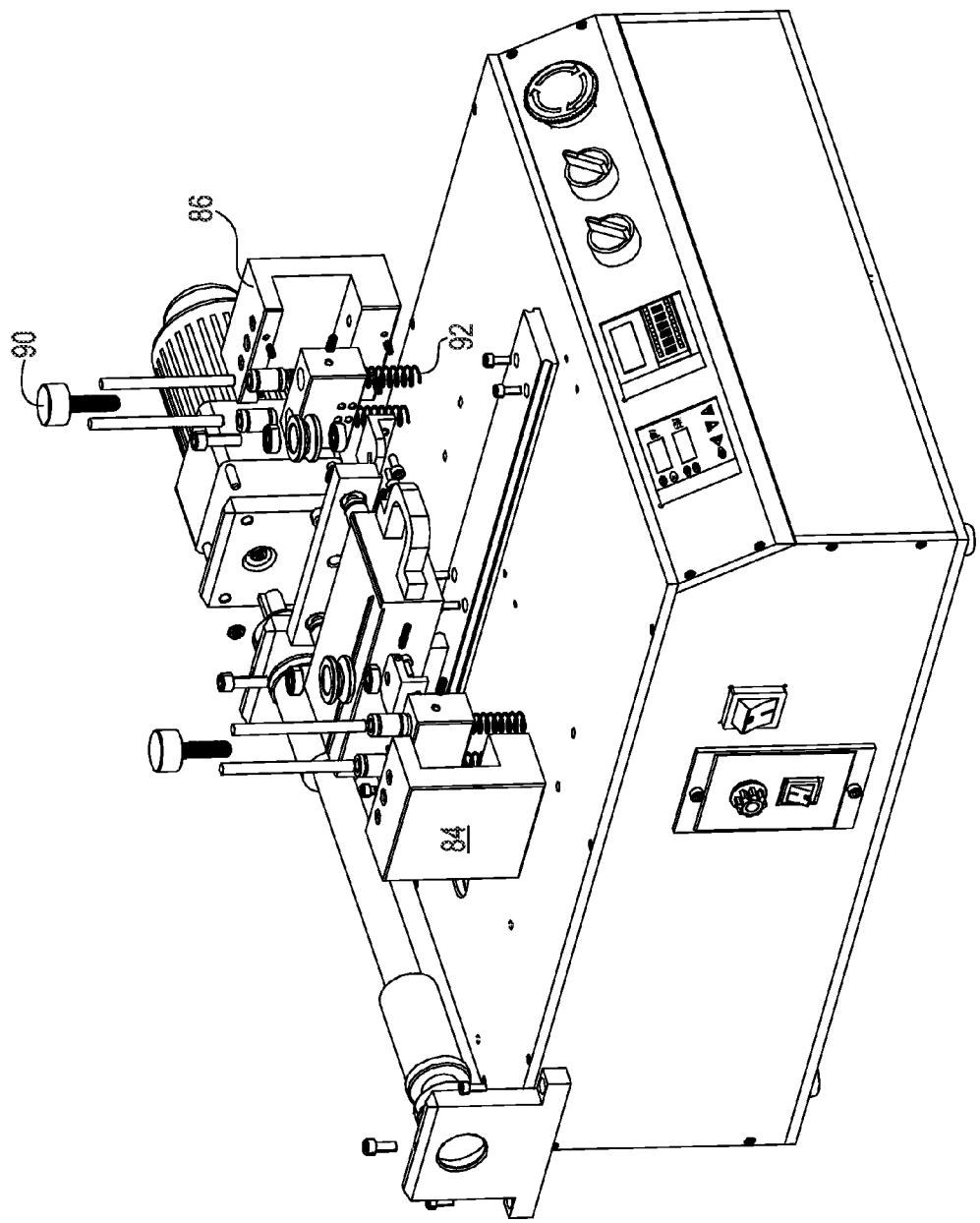
FIG. 6 is a view like FIG. 5 rotated 90 degrees.

To absorb any shocks caused by snagging of the wire (i.e. encounters with hard objects), typically glass shards, the spindle adjustment mechanism is preferably mounted on a bias element, in this case springs 92 (see FIGS. 5-6). A shock can occur if the wire encounters a glass fragment which has intruded into the intermediate layer in which case shock absorption could prevent cutting element breakage. In an automated embodiment, a tension or position sensor can measure abnormal movement (x, y or z axis) of the spindle or cutting element and stop the wire immediately upon detection.

In the preferred embodiment, spindles 80/82 control the plane in which the cutting element will track (i.e. the position of the cutting element relative to the intermediate layer it is cutting). The cutting element is preferably adjusted to be close to the interface plane adjacent the electronic display unit. Also preferable is a slight bias of the wire downwardly against the electronic display 22 or the bottom of the intermediate layer 24 achievable by locating the tracking band of the spindles below that interface plane. If the display unit 20 is inserted opposite of what is described above, i.e. with electronic display unit on top, then the wire should be biased slightly upwardly so the tracking band will be above the interface plane.

Figure 8:
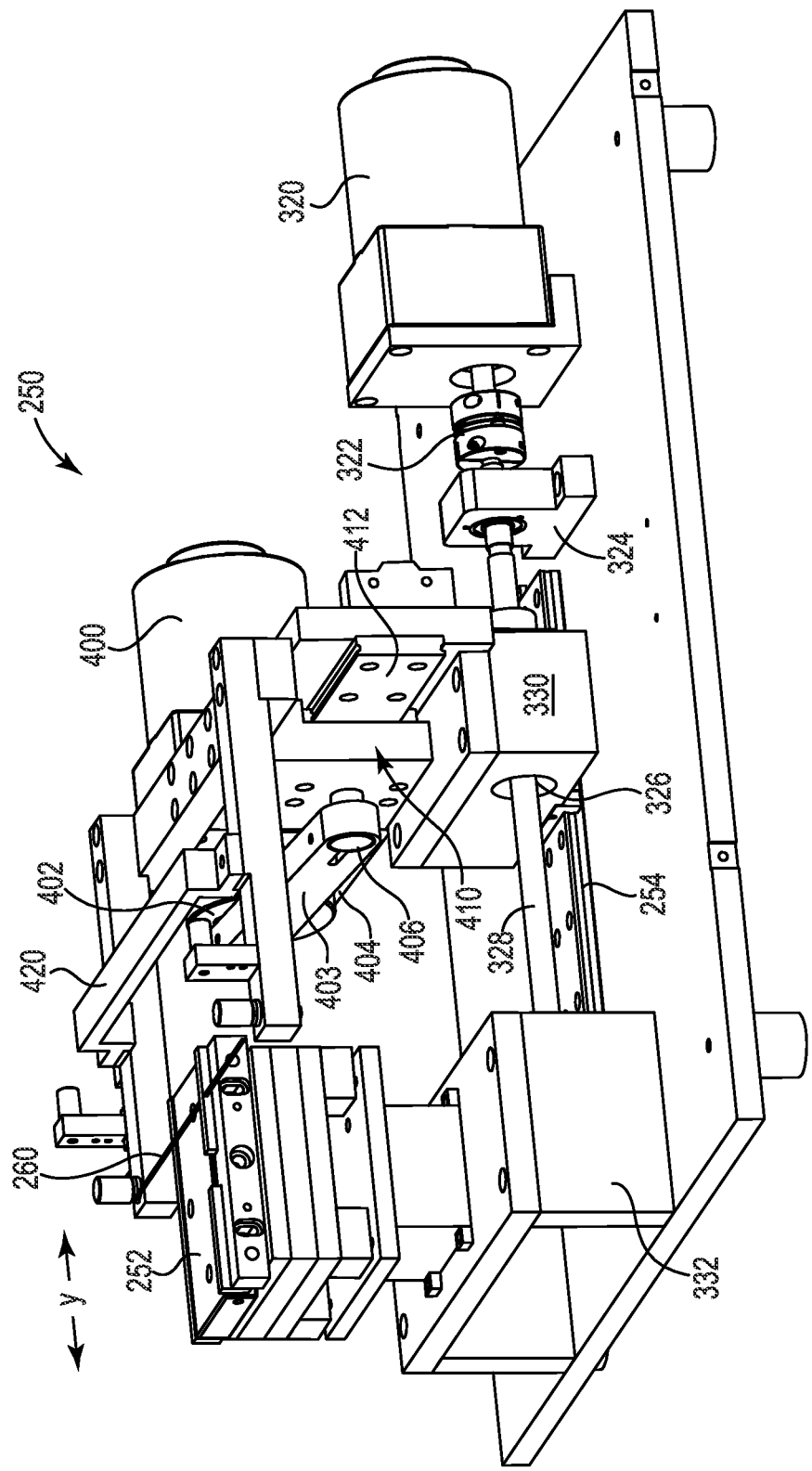
FIG. 8 is a front perspective view of an alternative embodiment with a blade replacing the wire.
Figure 9:
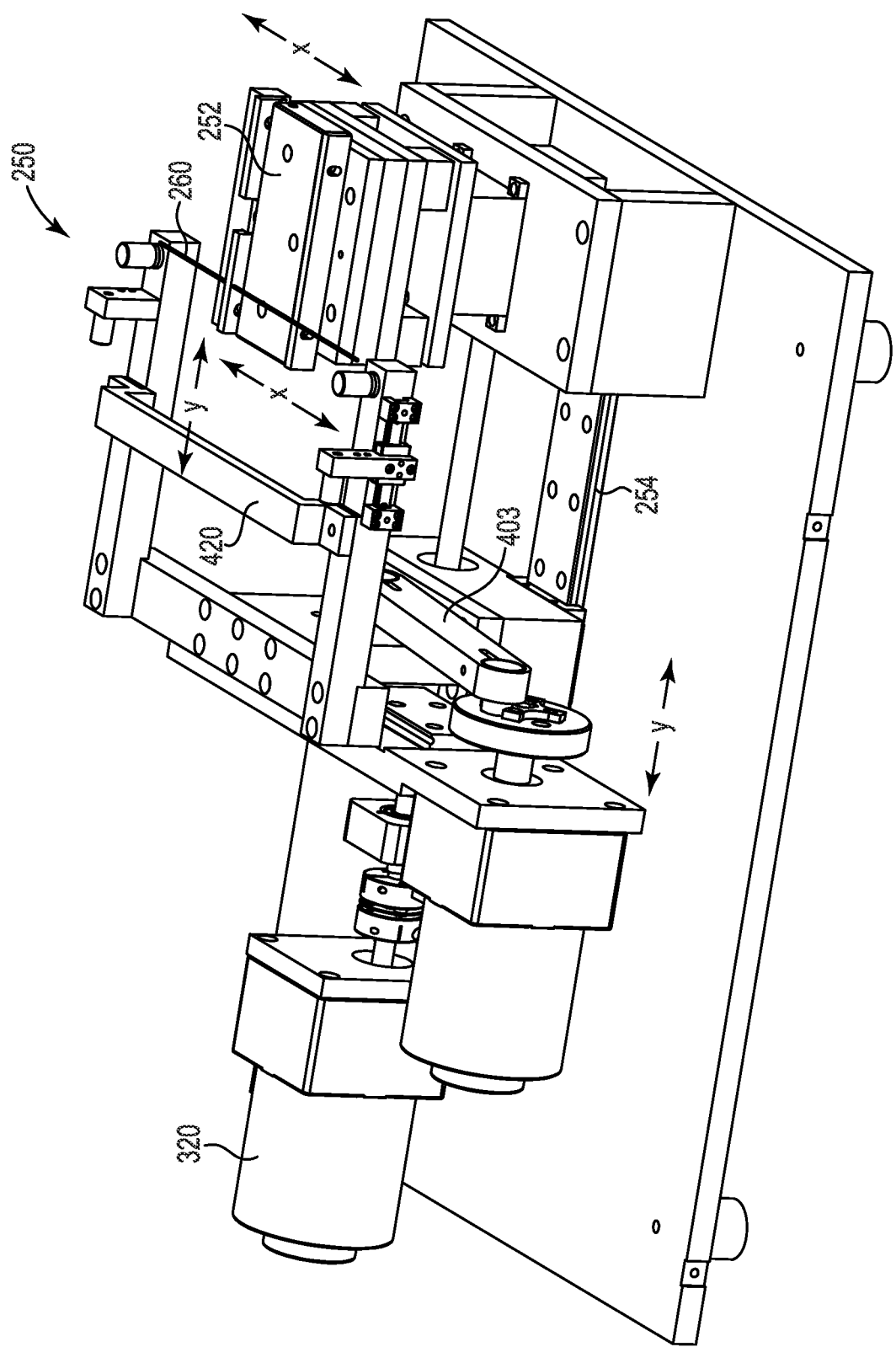
FIG. 9 is a rear plan view of the embodiment shown in FIG. 8.

An alternative to the wire cutting embodiments above, an alternative cutting element in the form of a planar blade is shown in the blade cutting machine 250 in FIGS. 7-8. To the extent the elements of the blade machine are similar to the wire cutting machine, the parts are indentified by the same number increased by 200.

The display unit 20 is not shown in this embodiment but like in the wire cutter, is placed in a carrier/bed/jig/carriage 252 which may be moveable as in the wire machine on a rail 254 or as shown, is fixed in position whilst the blade 260 is moved thru the display unit intermediate layer in the Y axis direction. Blade 260 is shown as a narrow blade (ca. 5 mm) but can also be a wide 1-20 mm or wider for greater rigidity. The blade is shown aligned orthogonally to the display unit but may be skewed for a diagonal cut as also expected for the wire cutting machine above.

The drive train in this embodiment is also applicable to the wire cutter embodiment. A motor 322 has a drive shaft connected to a coupler 324 which drives a shaft 328 thru a bearing 324 and aperture 326 in support block 330. Carriage 252 sits atop a support structure 332 which is moveable on rails or bearing (not shown). Shaft 328 may be threaded and drives the movement of structure 332 as a screw drive (a fixed threaded plate receives the threaded shaft). Alternative drive systems are possible as is manual operation.

Blade 260 is preferably a thin planar blade of thickness less than that of the intermediate layer. Blade cutting is faster than wire cutting but is not always useable if the glass is damaged to the point that shards are driven too far into the intermediate layer. The blade can be straight or serrated and can be heated to help melt the intermediate layer or may be heated on one side and cooled on the other (the cooled side would be adjacent to the electronic display portion) and the leading edge may be heated.

The blade drive mechanism preferably includes a motor 400, a drive shaft (not visible) to a drive wheel 402, which drives a shaft 403 to a belt 404, and then to a bearing and shaft 406. Shaft 403 is affixed to wheel 402 off axis and with a bearing to convert the rotary motion of the wheel to reciprocal motion of the shaft which is then transferred into reciprocal motion of the blade 260 on a second sliding carriage 410 which rides on a rail 412 to move reciprocally in a X axis direction while moving into the intermediate layer in the Y axis direction.

Though the preferred embodiment is motorized in the Y direction, it can also be operated manually with handle 420.

Blade 260 is preferably aligned with the intermediate layer at its midpoint or adjacent to the electronic display portion without engaging its surface. One option is to angle/tip the leading edge of the blade slightly away from the electronic display portion. This will further prevent engaging its surface.

To minimize encounters with glass intrusions into the intermediate layer, the blade can alternatively be angled slightly toward the electronic display.

Figure 10:
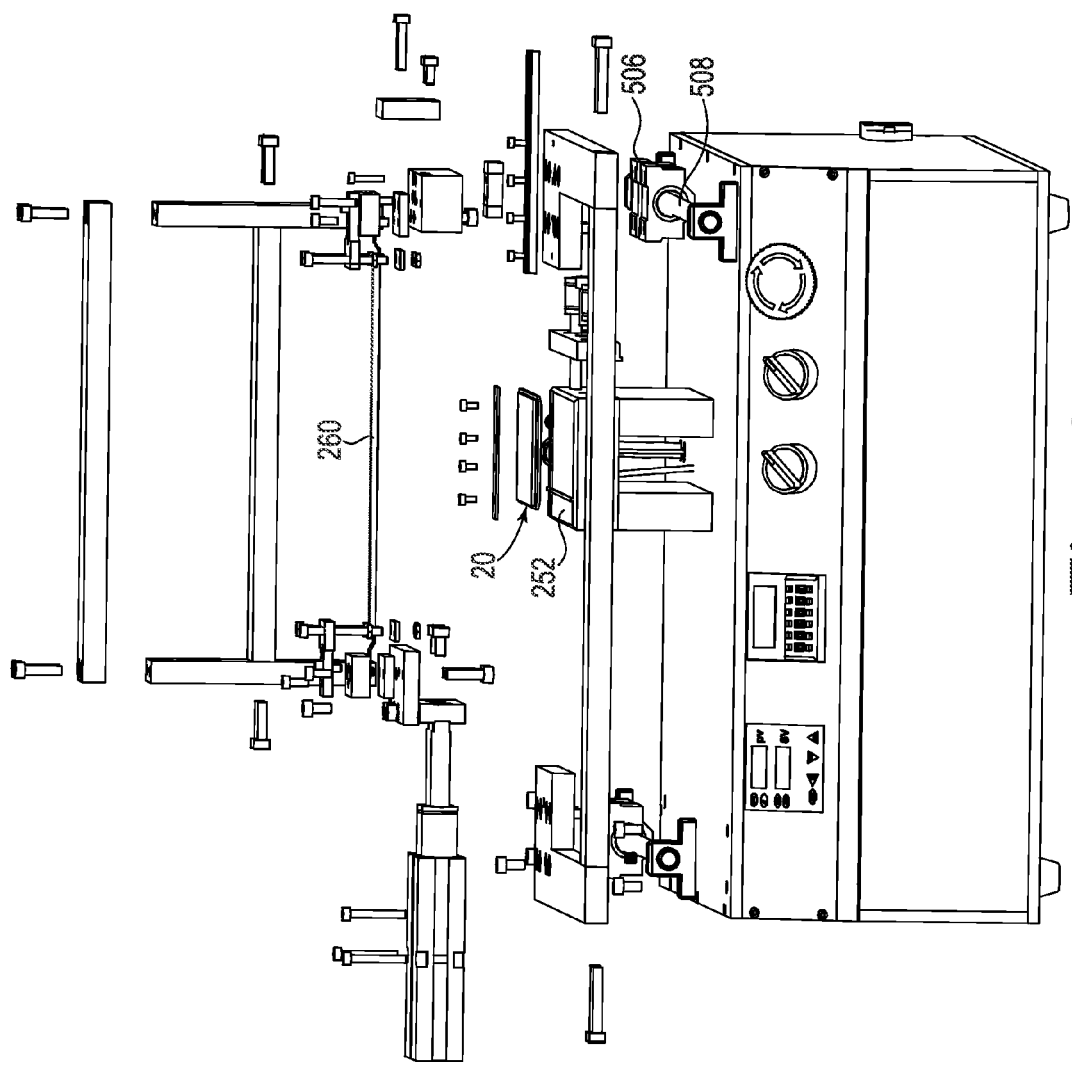
FIG. 10 is a font perspective view of a third embodiment of a cutting machine where the cutting is done in the longitudinal direction on the display unit.
Figure 11:
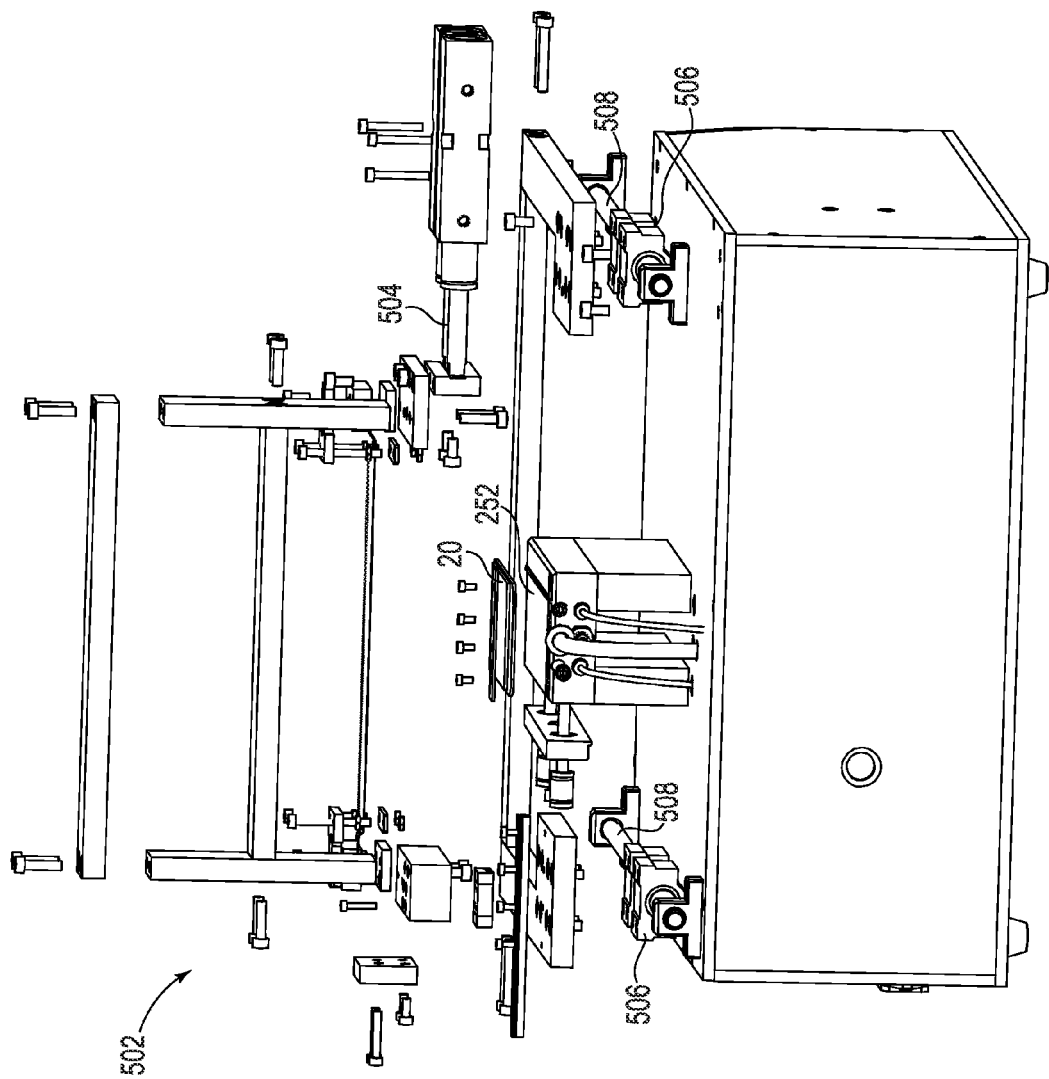
FIG. 11 is a rear view of the subject of FIG. 10.

FIGS. 10 and 11 illustrate a version of the blade cutting machine (also applicable to the wire cutter) with the blade (shown schematically as a wire) penetrating the intermediary layer from the longitudinal (longer) side of the display device 20. The blade 260 is held in a reciprocating assembly 502 preferably on a track. Alternatively, a continuous blade, such as used in a band saw, could run continuously in one direction. Reciprocation can be manual or by a solenoid actuator 504. The transverse movement of the display unit in the carriage 252 is facilitated by sliding mounts 506 which move along shaft 508. Manual or automated movement of the blade into the intermediate layer separates the broken glass. Of course, it is also possible that the carriage be moveable in a direction transverse (or oblique) to the cutting blade/wire with the blade/wire being stationary.

The machines preferably include at least one force sensor to detect an encounter with glass shards or other impediments/intrusions. Upon such an encounter the cutting action can be stopped and the blade/wire withdrawn.

As mentioned the cutting speed can be increased by heating the blade, heating the intermediate layer, applying a solvent to the blade while cutting or by other means to soften or dissolve the intermediate layer.

In place of the blade or wire, other cutting tools may be substituted including but not limited to water/solvent jet cutting, laser cutting etc.

The disclosure also includes a computer controlled machine which a server, processor and memory which carry out the method as disclosed.

The description of the invention and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A method of removing a protective glass top surface from a display unit having a glass top, an electronic display portion, and an intermediate layer therebetween, the method comprising the steps of, the display unit defining an axis extending along said intermediate layer:

fixing the display unit in a carriage with the intermediate layer being exposed on all sides;

aligning a cutting device in a coplanar relationship with the intermediate layer;

biasing the cutting device in the intermediate layer adjacent the electronic display portion and away from the glass, driving the cutting device into the intermediate layer while moving the cutting device and display unit relative to each other along a diagonal direction relative to said display unit axis;

advancing the cutting device into the intermediate layer to separate the glass top from the electronic display portion.

2. The method of claim 1, wherein the cutting device is a flexible wire which travels from a first spool to a second spool and back and first and second guides located adjacent said carriage, and including the step of locating said guides below said carriage and closer to said electronic display portion than said glass, so that said wire is biased toward said display portion.

3. The method of claim 1 further including the step of applying solvent to the cutting device, said solvent capable of softening the intermediate layer.

4. The method of claim 1 wherein said cutting device is a wire.

5. The method of claim 1 wherein said cutting device is a flat blade of thickness less than the intermediate layer and including the step of adjusting the leading edge of the cutting device so that it engaged more adjacent said electronic display than said glass.

6. The method of claim 1 wherein said cutting device is spray jet of cutting fluid.

7. The method of claim 1 wherein said cutting device is heated by passing a current through it.

8. A method of separating a protective glass top surface from a display unit having a glass top, an electronic display portion, and an intermediate layer therebetween, the method comprising the steps of:

fixing the display unit in a carriage with the intermediate layer being exposed on all sides;

aligning a cutting blade in a coplanar relationship with the intermediate layer;

biasing the cutting blade in the intermediate layer immediately adjacent the electronic display portion and away from the glass by locating the guide path of the blade below the display;

heating a side of the cutting blade facing away from said electronic display portion, and cooling a side of the cutting blade facing toward said electronic display portion;

driving the cutting blade into the intermediate layer so that the cutting blade and display unit are moved relative to each other along an axis generally orthogonal to the cutting blade;

advancing the cutting blade into the intermediate layer to separate the glass top from the electronic display portion.

9. A machine for removing a protective cover glass from a display unit having a cover glass, an electronic display portion, and an intermediate layer sandwiched therebetween, said intermediate layer defining a first plane between the layer and the glass, a second plane between the intermediate layer and the electronic display portion, and an axis extending along and between said first and second planes, the machine comprising:

a housing;

a carrier for holding the display unit, said carrier configured to hold said unit without blocking access to said intermediate layer;

a slideable interface interposed between the housing and carrier for moving the carrier relative to the housing;

a pair of first and second guides connected to said housing and located on either side of the carrier;

a cutting element configured to travel in a path from one guide to the other in a third plane, said guides are located below said second plane so that said cutting element is biased to engage said intermediate layer at second plane;

wherein said cutting element is aligned between said first and second planes to diagonally cut through said intermediary layer along said axis and separate the glass from the electronic display element.

10. The machine of claim 9 further including an adjuster for adjusting the position of said guides and consequently said cutting element to apply greater or lesser bias force against said display portion.

11. The machine of claim 9 wherein said cutting element is a wire.

12. The machine of claim 9, further comprising a supply spool and a take up spool, wherein said cutting element comprises a wire, and wherein the cutting element is configured so that the wire follows a path from the supply spool to the first guide, to the display unit, to the second guide, and to the take up spool.

13. The machine of claim 12 wherein said wire is driven by a motor and controller which creates reciprocal motion.

14. The machine of claim 9 wherein said cutting element is a wire and wherein the wire is heated.

15. The machine of claim 14 including a pair wire heaters located adjacent said display unit on both sides thereof, so that the wire is heated before it cuts said intermediate layer regardless of which direction the wire is traveling.

16. The machine of claim 14 further comprising a source of electricity in communication with said cutting element, and wherein said cutting element is heated by passing electricity therethrough.

17. The machine of claim 14 further including a cooling device placeable adjacent the electronic display portion and a heating device placeable adjacent the cover glass.

18. The machine of claim 9 wherein said cutting element is a fluid jet.

19. The machine of claim 9 wherein said cutting element includes a solvent sprayer.

20. The machine of claim 9 wherein said cutting element includes a laser cutter.

21. The machine of claim 9 wherein said cutting element is stationary and said carrier is movable.

22. The machine of claim 9 wherein said cutting element is moveable and said carrier is stationary.

23. The machine of claim 9 wherein said cutting element and carrier are both movable.

24. The machine of claim 9 wherein said guides include a shock absorber.

25. The machine of claim 24 wherein said shock absorber includes a spring bias element on which said guides are mounted.

26. The machine of claim 9 wherein the cutting element includes a source of heat to heat a leading edge of the element on its exterior face.

27. The machine of claim 9 further including a heating device placeable adjacent the cover glass.

28. The machine of claim 9 further including a pool of non-conductive cooling fluid in which the electronic display portion is received.

* * * * *

UNITED STATES PATENT AND TRADEMARK OFFICE
CERTIFICATE OF CORRECTION

PATENT NO.         : 8,888,953 B2
APPLICATION NO.    : 13/914794
DATED              : November 18, 2014
INVENTOR(S)        : Teo Chong Teck Page 1 of 1

It is certified that error appears in the above-identified patent and that said Letters Patent is hereby corrected as shown below:

In the Claims

Please cancel the original version of Claim 1, located in the issued Patent on column 9, lines 45-63, and replace with the new text below:

1. A method of removing a protective glass top surface from a display unit having a glass top, an electronic display portion, and an intermediate layer therebetween, the display unit defining an axis extending along said intermediate layer, the method comprising the steps of:
   fixing the display unit in a carriage with the intermediate layer being exposed on all sides;
   aligning a cutting device in a coplanar relationship with the intermediate layer;
   biasing the cutting device in the intermediate layer adjacent the electronic display portion and away from the glass,
   driving the cutting device into the intermediate layer while moving the cutting device and display unit relative to each other along a diagonal direction relative to said display unit axis;
   advancing the cutting device into the intermediate layer to separate the glass top from the electronic display portion.

Signed and Sealed this
Twenty-ninth Day of September, 2015

Michelle K. Lee
*Director of the United States Patent and Trademark Office*